(12) United States Patent
Nuñez et al.

(10) Patent No.: US 7,293,787 B2
(45) Date of Patent: Nov. 13, 2007

(54) SUSPENSION ARM FOR MOTOR VEHICLE

(75) Inventors: Jose Ramón Izquierdo Nuñez, Burgos (ES); Rafael Teijeiro Castro, Burgos (ES)

(73) Assignee: ZF Ansa Lemforder, S.L., Burgos (ES)

( * ) Notice: Subject to any disclaimer, the term of this patent is extended or adjusted under 35 U.S.C. 154(b) by 411 days.

(21) Appl. No.: 10/517,326

(22) PCT Filed: Jul. 7, 2003

(86) PCT No.: PCT/ES03/00336

§ 371 (c)(1),
(2), (4) Date: Dec. 9, 2004

(87) PCT Pub. No.: WO2005/005180

PCT Pub. Date: Jan. 20, 2005

(65) Prior Publication Data

US 2005/0200096 A1    Sep. 15, 2005

(51) Int. Cl.
*B60G 7/00* (2006.01)
(52) U.S. Cl. .............................. 280/124.134; 280/124.1
(58) Field of Classification Search ............. 280/124.1, 280/124.134, 124.153
See application file for complete search history.

(56) References Cited

U.S. PATENT DOCUMENTS

| 1,704,834 | A |   | 3/1929  | Jansson                      |
|-----------|---|---|---------|------------------------------|
| 2,933,336 | A |   | 4/1960  | Pritchard et al              |
| 2,977,131 | A | * | 3/1961  | Moskovitz et al. ... 280/124.134 |
| 4,016,950 | A | * | 4/1977  | Allison ................ 280/124.134 |
| 5,362,090 | A | * | 11/1994 | Takeuchi ............. 280/124.152 |
| 5,516,129 | A | * | 5/1996  | Kurosu et al. ........ 280/124.134 |
| 5,662,349 | A | * | 9/1997  | Hasshi et al. ......... 280/124.134 |
| 6,062,762 | A |   | 5/2000  | Lustig                       |
| 2002/0005621 | A1 | * | 1/2002 | Christophliemke et al. ...... 280/124.134 |
| 2003/0034625 | A1 | * | 2/2003 | Runte et al. .......... 280/124.134 |
| 2004/0135337 | A1 | * | 7/2004 | Alesso et al. ......... 280/124.134 |

FOREIGN PATENT DOCUMENTS

| DE | 102 12 791 A1 | 10/2003 |
| EP | 0 913 277 A1  | 5/1999  |
| EP | 1 223 058 A2  | 7/2002  |

* cited by examiner

*Primary Examiner*—Ruth Ilan
(74) *Attorney, Agent, or Firm*—McDermott Will Emery LLP

(57) ABSTRACT

It incorporates a body (1) formed in sheet metal by stamping with reduced thickness and maximum inertia, and consists of a modular element ready for mounting which incorporates: a ball joint (2) located inside an external front housing (5) in which it is coupled by means of a lower socket (6) and a cover (7) which fit together and are welded by laser, a front silent-block (3) which reveals a cylindrical body from the surface of which some pairs of securing flaps (11) project radially which are inserted in a slot (8) defined in a concavely curved front housing (9), folded and welded by laser welding, and a rear silent-block (4) which is incorporated in a rear housing (12) by means of some press-fit bushings (15).

1 Claim, 6 Drawing Sheets

SUSPENSION ARM FOR MOTOR VEHICLE

OBJECT OF THE INVENTION

The present invention relates to a suspension arm for motor vehicles which is manufactured in sheet metal pressed in a single light-weight piece of optimised section integrating additional elements in order to constitute a single piece ready for mounting in motor vehicle assembly lines.

The suspension arm consists on a light-weight body designed with a geometry which favours the greatest possible inertia which has three housings in which are incorporated respectively, a ball joint which is secured with the help of a socket and cover, joined by laser welding, a silent-block serving to absorb the front-end vibrations which is linked by folding some securing flaps and laser welding, and a silent-block serving to absorb the back-end vibrations which is attached to the body by means of two bushings fitted by pressure.

BACKGROUND OF THE INVENTION

The front trains of vehicles usually incorporate a suspension arm which allows the wheel hub of the vehicle to be linked to the chassis, comprising a body provided with three securing points consisting of a ball joint on the wheel side and two silent-blocks on the side of the chassis which result in this link being mobile and the vehicle having independent suspension on each wheel. There are different types of suspension arm depending on the type of suspension of the vehicle (McPherson or conventional) and on the materials employed.

Forged arms are used with McPherson suspension and they consist of an arm on which the ball joint is machined and the silent-blocks are mounted.

The sheet metal arms are employed both in McPherson suspensions and in conventional suspensions consisting of the assembling of two pieces stamped from sheet metal, welded to form a box, the material employed has to be good quality with a high elastic limit to guarantee that deformations of the arm are not produced as a result of the impacts inherent in the suspension.

In these suspension arms in sheet metal a decrease in weight is achieved with respect to the forged arm, however they usually lack the adequate amount of mass to furnish the required inertia and mechanical strength.

On the other hand, suspension arms can be designed in aluminium, which, with less weight assure the same functional characteristics provided with other materials.

In the Patent of Invention EP 0401547 a single triangular suspension arm can be found which has at one of its vertices a ball joint which connects with the wheel strut holders and which has individual silent-blocks on the other two vertices thereof in articulations which pivot with respect to the chassis.

DESCRIPTION OF THE INVENTION

The suspension arm for vehicles object of this invention discloses a modular solution ready to incorporate in the motor vehicle assembly line consisting of a body in sheet metal conformed by stamping which includes the ball joint incorporated by a process of laser welding, a rear silent-block incorporated by means of some press-fitted bushings and a front silent-block coupled by means of some securing flaps and laser welding.

The suspension arm disclosed, in contrast to other suspension arms, comprises a single module integrating different functions which are described below:

In the first place an alternative assembly operation is proposed to make the fastening or closing of the ball joint on the suspension arm at reduced cost by employing laser welding technology applied on two metal pieces which enclose the ball joint. One of the pieces consists of a lower socket which is incorporated in the external front housing foreseen for such purpose on one of the vertices of the body and which rests by means of a peripheral projection on the peripheral rim of said housing, holding the ball joint in the interior thereof, which will be covered by the other piece consisting of a cover which couples on the socket and is welded by laser on the upper face of the body assuring the closure of the assembly so constituted.

In second place it is intended that the body of the suspension arm be constituted in a single modular piece which establishes the wheel-chassis linkage in an optimum manner with a special geometry of reduced thickness and maximum inertia.

The third function sought consists of the absorption of front-end vibrations by means of the front silent-block which is incorporated in an alternative and simple manner by folding of some securing flaps and laser welding in the concavely curved internal front housing foreseen in the internal front vertex of the suspension arm. More specifically the front silent-block incorporates a number of securing flaps, usually grouped in pairs and positioned perpendicularly to the cylindrical body of the front silent-block which are inserted in a slot made in the internal front housing and which are folded thereafter in opposite directions to establish the securing of the front silent-block, subsequently proceeding to apply some weld beads which will attach the front silent-block securely to the body of the suspension arm.

The fourth function relates to the absorption of rear-end vibrations by means of a rear silent-block which is connected in a simple manner in the rear housing foreseen in the back vertex of the suspension arm by means of two bushings which are press-fitted inside one another.

The fifth function achieved by means of said suspension arm relates to the modular concept of the arm itself as an element integrating the previously described functions obtaining an economical and light-weight assembly ready for incorporating in the assembly lines of motor vehicle manufacturers.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

PREFERRED EMBODIMENT OF THE INVENTION

Figure 1:
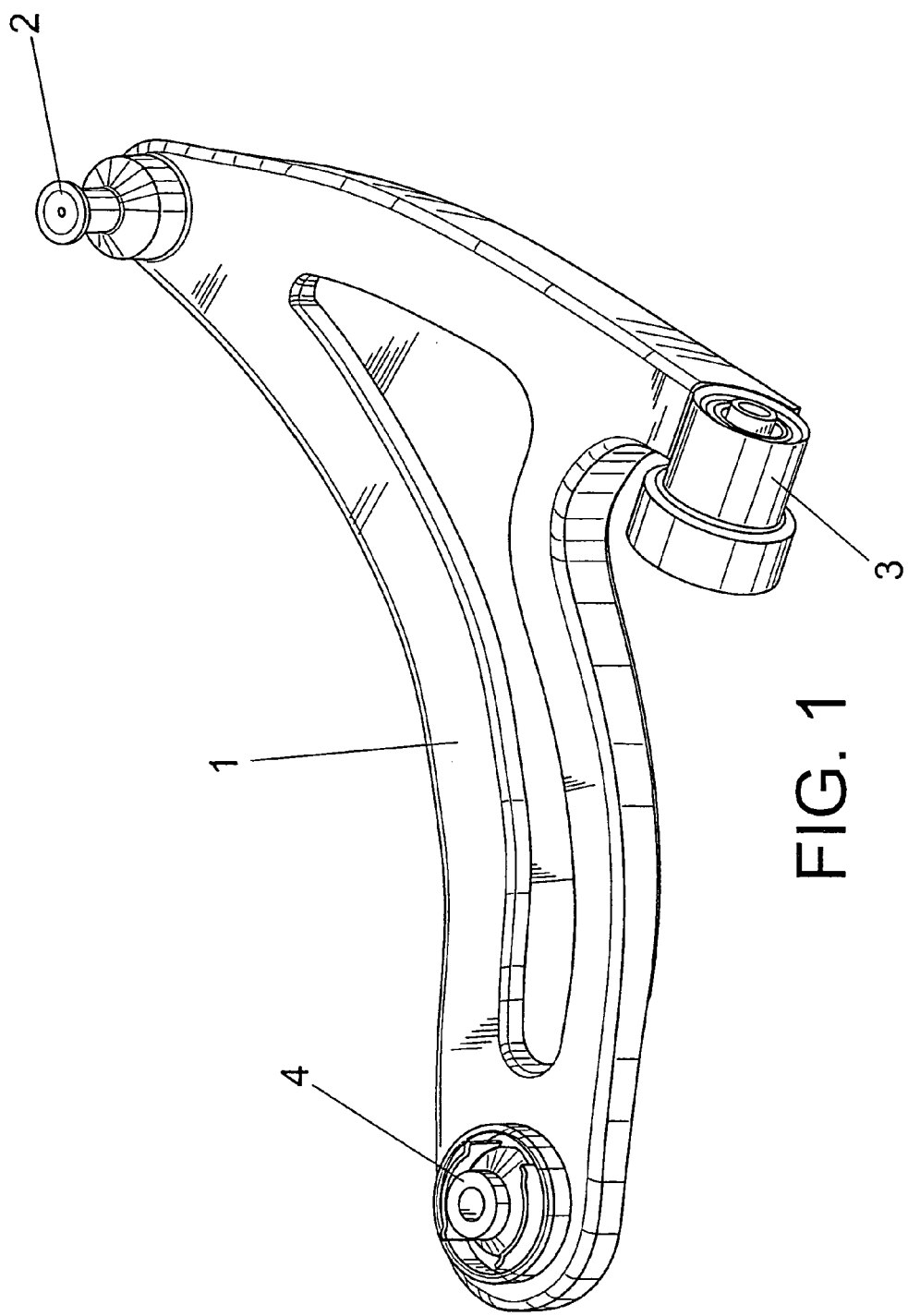
FIG. 1.—It shows a view in perspective of the modular suspension arm with the functional elements incorporated.
Figure 2:
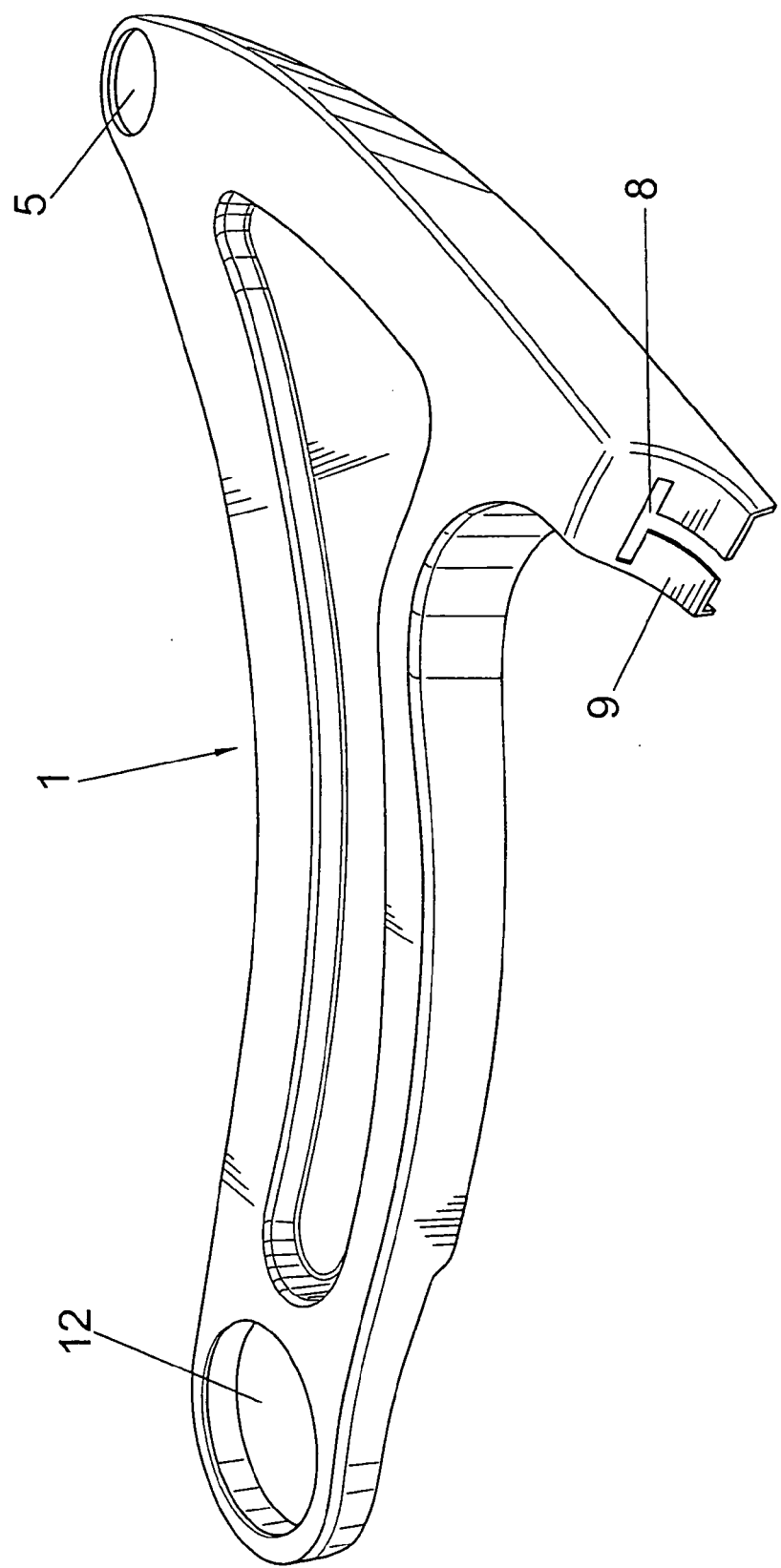
FIG. 2.—It shows a view in perspective of the body of the suspension arm in which the housings are observed in the vertices thereof.
Figure 3:
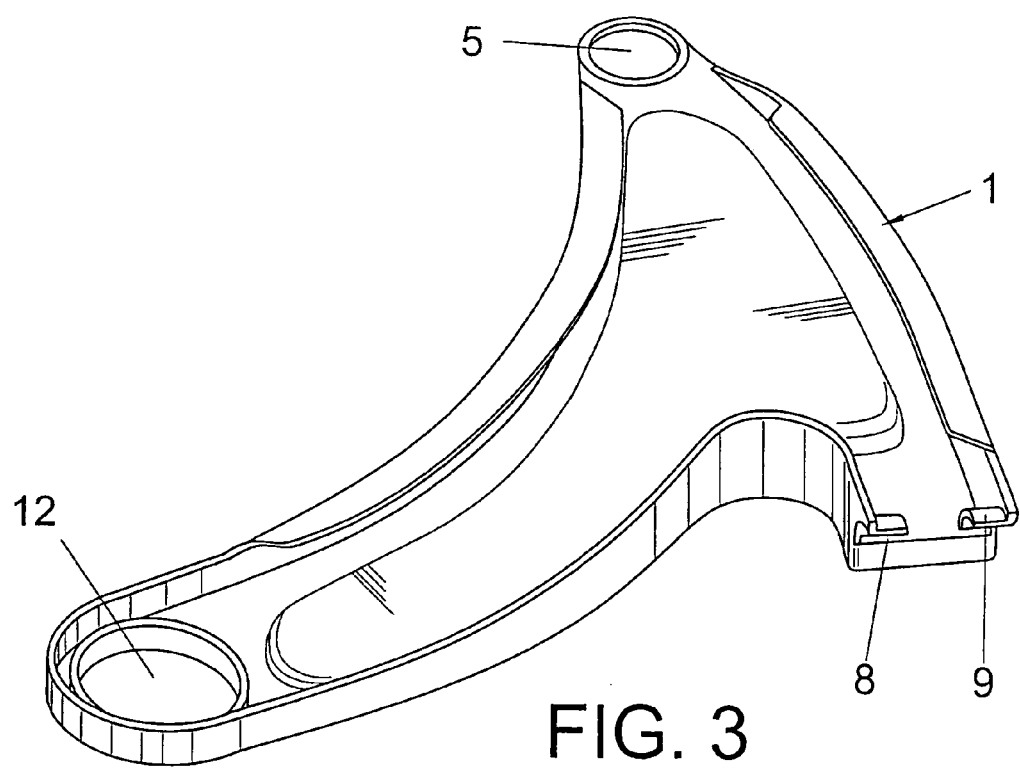
FIG. 3.—It shows a view in perspective of the suspension arm in which the assembly of the silent-blocks and of the ball joint in the housings of the body of the suspension arm can be observed.
Figure 4:
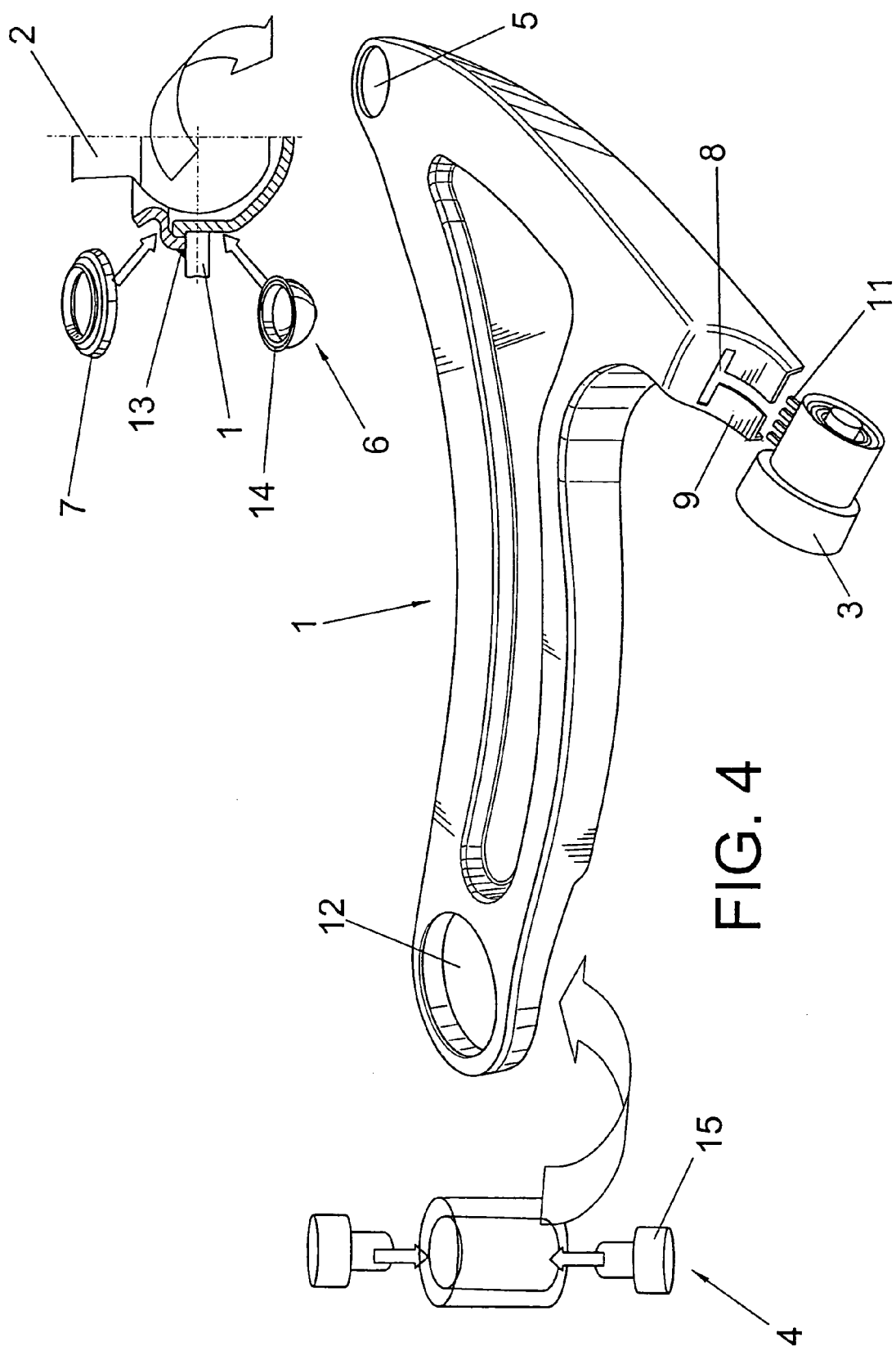
FIG. 4.—It shows a schematic view of the sequence of assembling the front silent-block.
Figure 5:
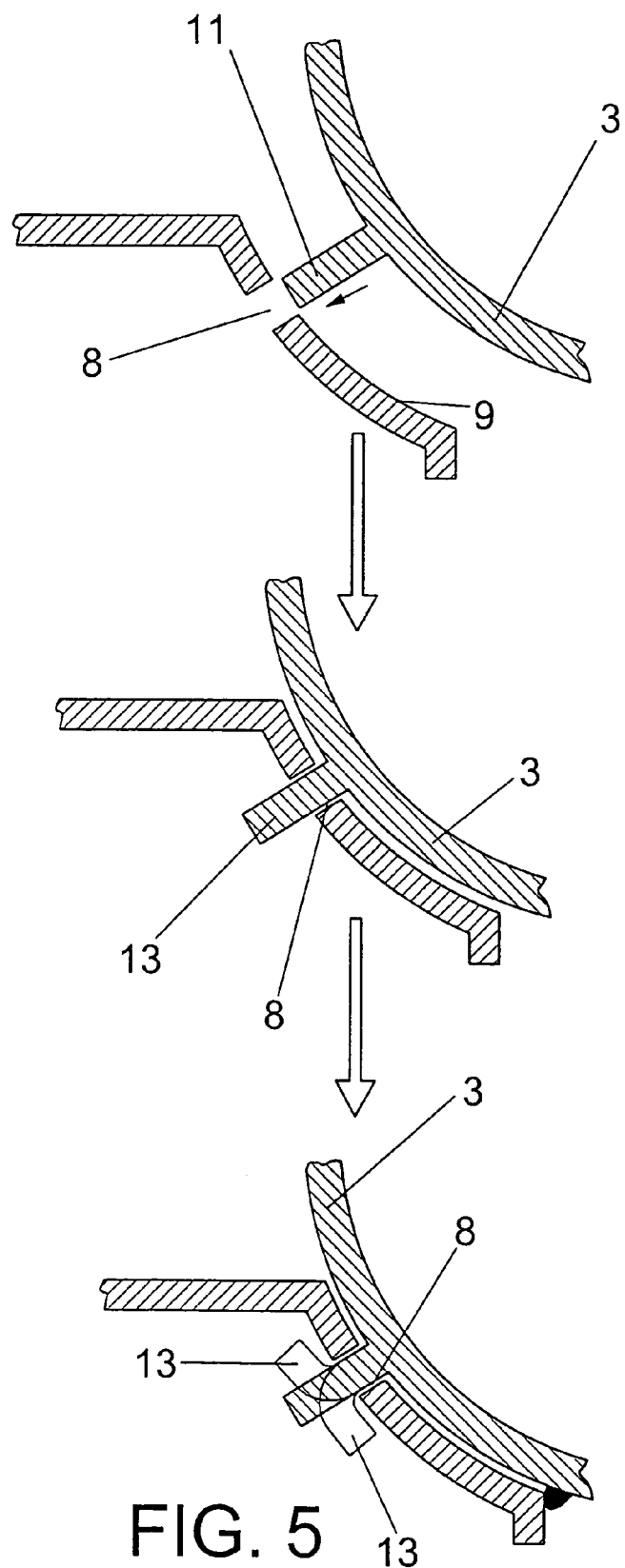
FIG. 5.—It shows a view of the coupling of the front silent-block in the internal front housing of the body in which the folded securing flaps and the weld beads are observed.

The suspension arm for motor vehicle which constitutes the object of this invention comprises fundamentally a body (1) which is linked to the strut holders of the wheel of a vehicle by means of a ball joint (2) and to the chassis of a vehicle by means of a front silent-block (3) and a rear silent-block (4).

Starting from this basic constitution the suspension arm is distinguished mainly because the body (1) is conformed in sheet metal by stamping with reduced thickness and maximum inertia, and it consists of a modular element ready for mounting which incorporates the ball joint (2), the front silent-block (3) and the rear silent-block (4).

The ball joint (2) is coupled inside an external front housing (5) of the body (1) between a lower socket (6) which is inserted in said external front housing (5) and rests through a peripheral projection (14) on the peripheral rim of said external front housing (5), and a cover (7) which fits on the lower socket (6) and is welded by laser on the upper face of the body (1) giving rise to the weld beads (13).

The front silent-block (3) reveals a cylindrical body from the surface of which some pairs of securing flaps (11) project radially which are inserted in a slot (8) defined in a concavely curved front housing (9) of the body (1), in which they appear folded alternatively in opposite directions the front silent-block (3) being joined to the body (1) by means of weld beads (10) obtained by laser welding.

The rear silent-block (4) is incorporated in a rear housing (12) by means of some press-fit bushings (15).

The invention claimed is:

1. Suspension arm for a motor vehicle, comprising a sheet metal stamped body;

a ball joint coupled inside an external front housing of said body between a lower socket and a cover, wherein said lower socket is inserted in said external front housing and rests through a peripheral projection on a peripheral rim of said external front housing, and wherein said cover fits on said lower socket and is joined to an upper face of said body by laser weld beads;

a front silent-block comprising a cylindrical body and a plurality of securing flaps projecting radially from said cylindrical body, wherein said securing flaps are inserted in a slot defined in a front concavely curved housing of said body and are folded in alternating opposite directions, and wherein said front silent-block is joined to said body by laser weld beads; and a rear silent-block incorporated in a rear housing of said body by a plurality of press-fit bushings, wherein said body is joined to a strut holder of a wheel of the motor vehicle by means of said ball joint and to a chassis of the motor vehicle by means of said front and rear silent-blocks.

* * * * *

UNITED STATES PATENT AND TRADEMARK OFFICE
CERTIFICATE OF CORRECTION

| | |
|---|---|
| PATENT NO. | : 7,293,787 B2 |
| APPLICATION NO. | : 10/517326 |
| DATED | : November 13, 2007 |
| INVENTOR(S) | : Jose Ramón Izquierdo Nuñez et al. |

Figure 6:
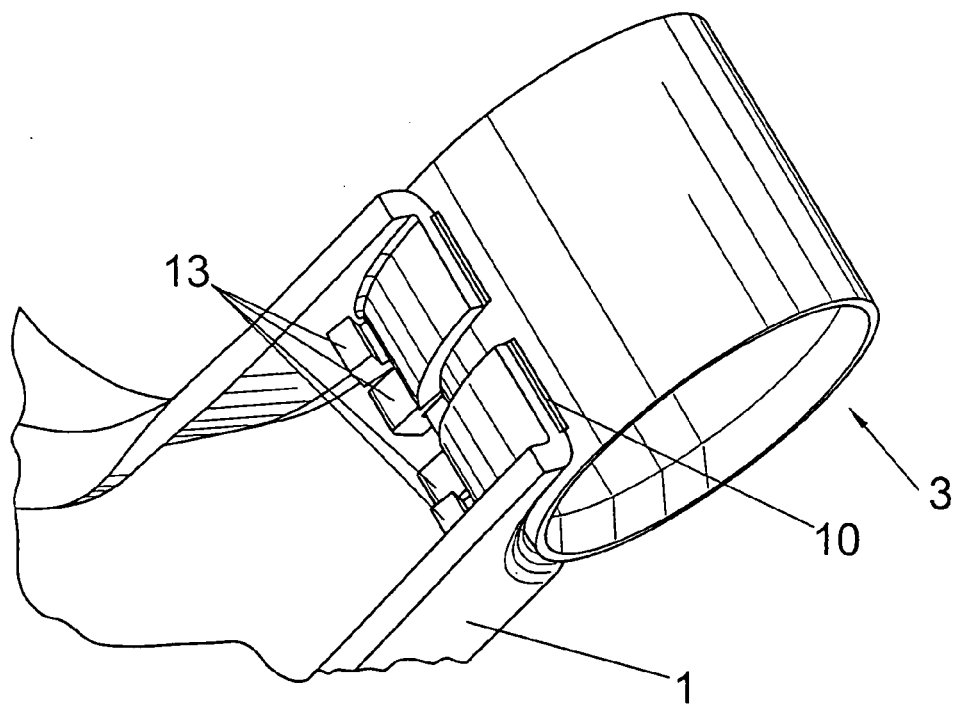

It is certified that error appears in the above-identified patent and that said Letters Patent is hereby corrected as shown below:

In Column 3, line 7, insert -- FIG. 6. - It shows a view in perspective of the front silent-block coupled in the internal front housing of the body of the suspension arm. --.

Signed and Sealed this

Twenty-sixth Day of August, 2008

JON W. DUDAS
*Director of the United States Patent and Trademark Office*